(No Model.) 4 Sheets—Sheet 2.

J. C. DUPEE.
ACETYLENE GAS GENERATOR.

No. 592,083. Patented Oct. 19, 1897.

Witnesses
Harold G. Barrett
L. Clinton Hamlink

Inventor
John C. Dupee
by Poole & Brown
his Attorneys (No Model.)    4 Sheets—Sheet 4.

J. C. DUPEE.
ACETYLENE GAS GENERATOR.

No. 592,083.    Patented Oct. 19, 1897.

Witnesses
L. Clinton Hamlin
Harold S. Barrett

Inventor
John C. Dupee
by Poole & Brown
his Attorneys

UNITED STATES PATENT OFFICE.

JOHN C. DUPEE, OF CHICAGO, ILLINOIS, ASSIGNOR OF ONE-HALF TO RIPLEY J. WHITE, OF SAME PLACE.

ACETYLENE-GAS GENERATOR.

SPECIFICATION forming part of Letters Patent No. 592,083, dated October 19, 1897.

Application filed August 29, 1896. Serial No. 604,248. (No model.)

*To all whom it may concern:*

Be it known that I, JOHN C. DUPEE, of Chicago, in the county of Cook and State of Illinois, have invented certain new and useful Improvements in Acetylene-Gas Generators; and I do hereby declare that the following is a full, clear, and exact description thereof, reference being had to the accompanying drawings, and to the letters of reference marked thereon, which form a part of this specification.

This invention relates to an improved apparatus for generating from calcium carbid the gas known as "acetylene gas."

As is well known by those familiar with the properties of calcium carbid, illuminating-gas is generated by the simple combination of water therewith, and the object of this invention is to provide a simple mechanical device by which water may be fed uniformly to a quantity or mass of the calcium carbid, thereby securing the production of gas in uniform quantity, so that it may be supplied to a burner directly from the vessel in which the gas is generated and the pressure produced by the generation of the gas will be of such uniformity as to maintain a suitably-constant supply to the burner.

The invention consists in the matters hereinafter described, and pointed out in the appended claims.

In the accompanying drawings, illustrating the invention.

Figures 1, 2, 3, 4:
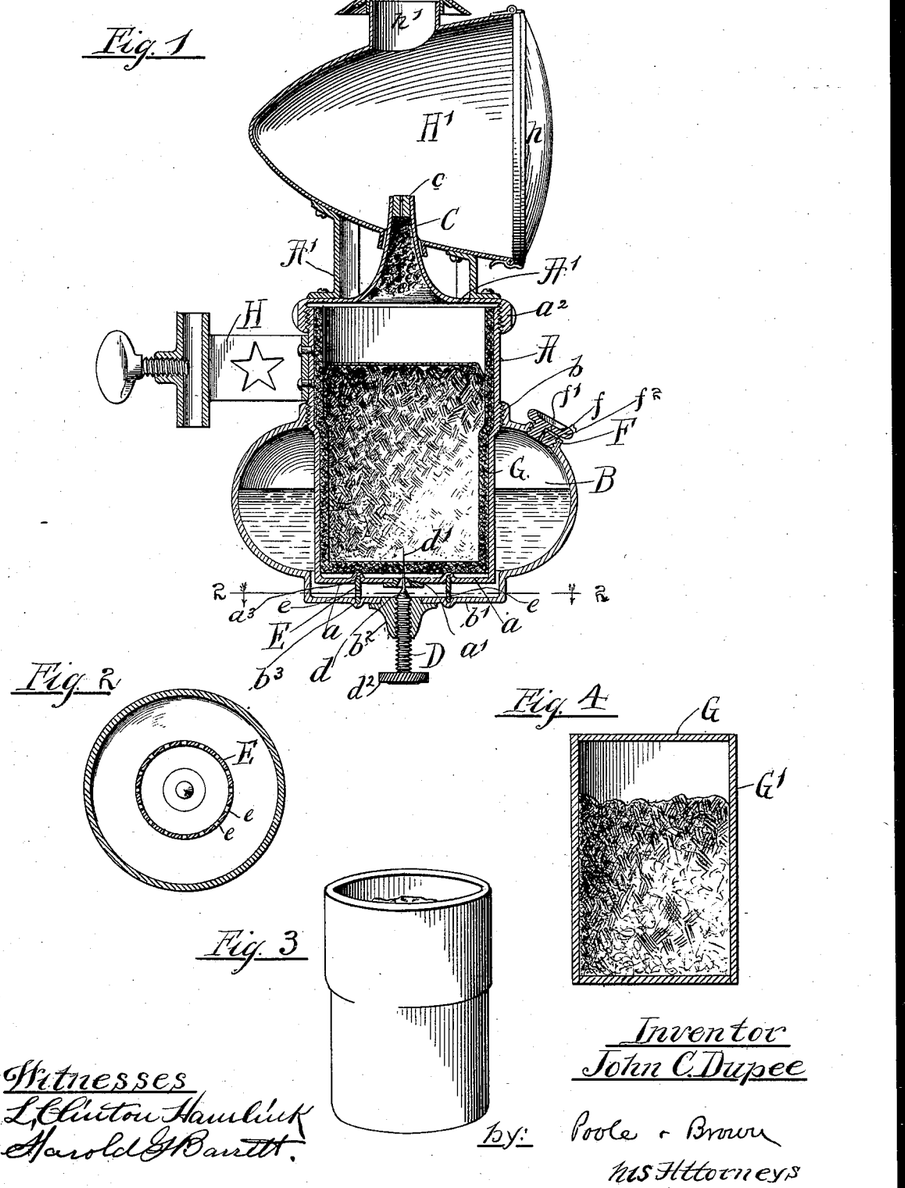
Figure 1 is a central vertical section of a gas-generator as applied to a bicycle-lamp.
Fig. 2 is a plan section thereof, taken on line 2 2 of Fig. 1.
Fig. 3 is a perspective view of the inner porous layer or receptacle for the calcium carbid before its insertion into the generator.
Fig. 4 is a sectional view of a cartridge of calcium carbid prepared in readiness for insertion into the generating-chamber of the lamp.

As shown in Figs. 1, 2, and 3, A is a gas-generating chamber which is intended to contain the calcium carbid and in which the gas is generated, the same being made preferably of cylindric form.

B is a receptacle for water which is attached to the chamber A and surrounds the lower part of the same. The bottom of the chamber A extends nearly to the bottom of the water-receptacle B, and in the bottom wall $a$ of said chamber A is formed a passage $a'$, through which water in the receptacle B may enter the bottom of said chamber A. The top of the chamber A is closed by means of a cover A', secured thereto, in the instance shown, by means of a marginal flange $a^2$, having screw-threaded connection with the cylindric side wall of the chamber. At the center of the cover A' is secured a discharge pipe or tube C, which terminates in a burner $c$, said pipe C preferably being of tapered or conical form and joining the body of the cover by a gradual curve, as shown. The water-receptacle B is shown in this instance as secured to the generating-chamber A by means of a flange $b$ at the upper margin of the water-receptacle, said flange having screw-threaded connection with the side wall of the generating-chamber at a point midway of the length of the same. The bottom wall $b'$ of the water-receptacle is located a short distance below and parallel with the bottom wall of the generating-chamber, and attached to said wall $b'$ is a hub $b^2$ through which passes a vertical screw-threaded valve-stem D, carrying at its upper end a conical valve-plug $d$, adapted to fit within and close the opening $a'$, these parts constituting a valve of the form commonly known as a "needle-valve." Attached to the inner end of said valve-plug $d$ and extending upwardly into the generating-chamber through the passage $a'$ is a needle $d'$, the function of which will be hereinafter stated. The valve-stem D is provided at its lower end with a milled head $d^2$, by which it may be turned for operating the valve.

E is a ring or annular partition extending between the lower part of the generating-chamber and bottom of the water-receptacle, said ring being provided with a plurality of small openings $e\ e$, located in its lower part and through which the water flows in its passage from the water-receptacle to the generating-chamber. The said ring E is shown as held in place by engagement of its opposite edges with grooves $a^3\ b^3$, formed in the bottom walls of the generating-chamber and water-receptacle, respectively.

F indicates the filling-orifice, formed in the upper part of the water-receptacle B and provided with a screw-plug $f$, by which the said filling-orifice is kept normally closed. In said screw-plug is formed a small air-passage $f'$, leading from the inner face of the plug outwardly thereof beneath its bearing-flange $f^2$, which engages the wall of the water-receptacle around the filling-orifice, such air-passage being so arranged that by slightly loosening or turning backward the plug air will be free to enter the receptacle through said passage.

Within the generating-chamber A is located a porous lining or jacket G, which extends throughout the side and bottom walls of the said chamber, said jacket, in the instance shown, being made in the form of a hollow cylinder with a closed bottom. Said porous lining I have constructed preferably of a number of layers of chemists' filter-paper, but any other porous material having the same general characteristics as said filter-paper may be employed in its place.

The parts described constitute the generator proper, but I have shown in Fig. 1 an attaching-arm H as secured to the side wall of the generating-chamber, and a reflector H', having a lens $h$ and a chimney $h'$, is attached to the top of the generating-chamber, the whole constituting in this instance a bicycle-lamp.

In preparing the generator for operation the porous lining G is first inserted in the generating-chamber and a desired quantity of calcium carbid in its natural or dry state is then inserted into the chamber through its open upper end and the cover A is then secured to the same. The receptacle B having been filled with water, the generator is in condition for operation. The needle-valve at the bottom of the chamber will preferably be closed before the water is inserted. In closing said valve the needle $d'$ will be thrust through the bottom of the lining G, and it follows that when the valve is again opened to admit water to the generating-chamber the small hole or puncture formed in the lining by the needle will be left open. Upon opening the valve, water from the receptacle will immediately begin to pass into the generating-chamber and by coming in contact with the calcium carbid in the bottom of said chamber will generate the gas, which will rise through the dry calcium carbid, and escaping from the tube C and burner $c$ will be burned at the latter.

The porous lining G has the effect of spreading or distributing the water by capillary action, so as to bring it into contact with a relatively large area of the calcium carbid. This will be better understood by the consideration of the fact that the porous material will by capillary action act as a wick to carry the water in all directions from the central inlet-opening of the generating-chamber, and as the porous layer will carry or conduct the water much more freely than will the calcium carbid, it follows that the water will, in the construction illustrated, be carried by the porous lining outwardly over the entire bottom surface of the chamber and upwardly at the side wall thereof, so as to act first upon a considerable area of the calcium carbid which is in contact with the porous layer, and later upon the inner portions of the calcium carbid as the water penetrates the mass of the same. The said porous lining therefore tends to promote equality of action in the generation of gas, it being obvious that the water when first admitted will begin to act upon a considerable area or surface of the calcium carbid which is in contact with the bottom and side walls of the porous lining and thus give a large initial generation of gas. The action of the device made as shown is thus distinguished from the operation which would take place if the water were admitted directly through the supply-opening $a'$, in which case the water would act first upon a small portion only of the calcium carbid in the immediate neighborhood of the hole, and then spread through the mass, so as to give a gradually-enlarging field of action and a gradually increasing quantity of gas. The purpose of the puncturing-needle $d'$ is to afford a more abundant supply of water at the very beginning of the operation of generating the gas, said hole having no appreciable effect after the water has made its way into the mass of calcium carbid, so as to leave a thick layer of the same over or above the puncture formed by the needle.

The porous lining arranged as described operates not only to distribute the inflowing water, in the manner set forth, but also to carry the water upwardly to the material in the upper part of the generating-chamber and above the level of the water in the receptacle, which water-level gradually descends as the water is absorbed by the calcium carbid.

At the beginning of the operation of the generator, it is usually desirable to admit a small quantity of air to the water-receptacle by loosening the screw-cap $f$, this being necessary in order to break the vacuum in the said chamber and permit the water to flow freely through the generating-chamber. It is found, however, that after the operation of generating the gas is fully under way, said air-valve may be closed, it being supposed that there may be a slight leakage of gas, which is under considerable pressure in the generating-chamber, backwardly into the water-receptacle, this allowing the water to flow with sufficient freedom into the generating-chamber.

The backward escape of gas in any considerable quantities from the generating-chamber into the water-receptacle is undesirable for the reason that gas thus escaped would be liable to leak from the chamber, and being highly inflammable it might take fire at the place of escape. Such backward leakage of gas is not only prevented by the presence of the porous lining B, which, being filled with water, constitutes a substantial barrier to the escape of gas therethrough, but also by the ring or partition E, which, as before described, is provided with small holes $e$ only through which the water may approach the inlet-orifice of the generating-chamber. These holes, moreover, are placed at the lower part of said ring, adjacent to the bottom wall of the water-receptacle, so that it would become necessary for the entire space within the said ring to become filled with gas before it would escape through said holes $e$ to the water-receptacle. The question as to whether there is any backward escape of gas to the water-receptacle permitting the flow of water to the generating-chamber when the filling-orifice is closed may be a doubtful one; but experience has shown that when the parts are constructed as described no backward escape of gas takes place in sufficient quantities to produce a flame when a light is applied at the filling-orifice. It may be assumed, therefore, that even when the filling-orifice is closed by its screw-plug, a quantity of air may still enter the receptacle sufficient to permit the passage of water by capillary action into the generating-chamber and the necessity for admitting air through the filling-opening when the device is first put in operation may arise solely from the necessity of a somewhat greater supply of air at that time. In the absence of careful experiments sufficient to determine these questions with certainty, it is sufficient to state that in practice I have found that if any backward escape of gas takes place it is in such small quantities as to be inappreciable and that the water will be fed properly to the generating-chamber when the filling-orifice is closed by a plug which fits such orifice with ordinary tightness and without special devices for making an air-tight joint.

Inasmuch as the calcium carbid, when combined with the water, is found to swell or increase in bulk to a considerable extent, the generating-chamber will not be entirely filled with the same, but a space will be left in the filling, as shown in the drawings.

As a further improvement, I propose to place in the gas-delivery pipe C a filling of raw cotton or other fibrous material, the same constituting a strainer to arrest fine particles of material being carried into the orifice of the burner, which orifice, owing to the intense light given by the gas generated, will for a lamp of ordinary size be exceedingly minute.

Instead of inserting the calcium carbid into the generating-chamber in the form of loose particles, the same may be prepared in a solid block or cylinder adapted to fit within the said chamber. The use of such a solid mass or cylinder is preferred for the reason that the calcium carbid in this shape is much more easily handled in recharging the generator than the loose material. When thus prepared in a solid mass or cylinder, the calcium carbid may be wrapped or covered with tin-foil or other impervious material, so as to preserve it from the moisture in the air, or, if preferred, the porous lining G may be placed around such cylinder at the time it is first made or thereafter, and the charge for a lamp thus furnished in the form of a cartridge in readiness to be slipped into the generating-chamber when a new charge is required. Such cartridge will consist of a cylindric mass of calcium carbid with a porous covering which may be, of course, wrapped with an impervious coating or wrapper, such as one made of tin-foil, in order to afford protection from moisture until it is used. The cartridge prepared for use is illustrated in Fig. 4, wherein G indicates the porous covering and G' an external air-tight wrapper. When a cartridge thus made is inserted in the lamp, the covering G at the top of the same will be removed or a number of holes will be punched therein in order to permit the gas to escape freely to the burner.

Figures 5, 6, 7:
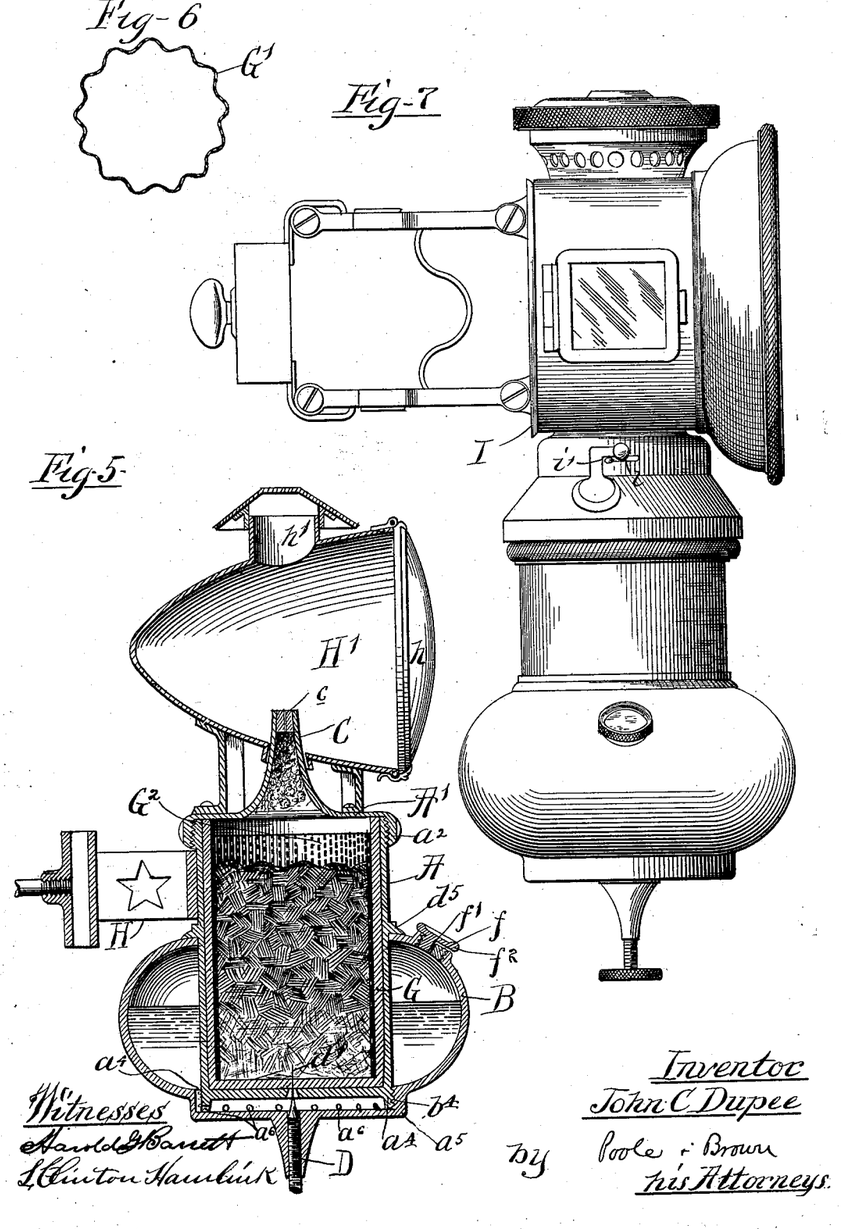
Fig. 5 is a sectional view showing a generator generally similar to that shown in Fig. 1, but containing modifications in matter of detail.
Fig. 6 is a sectional view of the inner perforated metal casing for the gas-generating chamber shown in Fig. 5.
Fig. 7 is an external elevation of a generator like that shown in Fig. 4 in combination with a lamp and detachable means connecting the lamp with the generator.

In Fig. 5 I have shown a generator which is generally similar to that illustrated in Fig. 1, said Fig. 5 being lettered in the same manner as the preceding figures. The generator shown in said Fig. 5 differs from that before described in the following particulars: The generating-chamber A, in this instance, instead of being secured to the water-receptacle B by screw-joint at the top of the water-receptacle, is attached thereto by screw-joint formed between a cylindric part $b^4$ at the bottom of the receptacle and the flange $a^4$ at the lower margin of the generating-chamber, a flange $a^5$, located on the outer surface of the generating-chamber above the upper margin of the receptacle B, being constructed to bear against the same, so as to form a suitably tight joint at this place. Notches $a^6$ are formed in the flange $a^4$, said notches performing the function of the holes $e$, (shown in Fig. 1,) to permit the water to flow toward the inlet-opening $a'$ while preventing any outward flow of gas toward the water-receptacle. I have shown in Fig. 5 a perforated sheet-metal cylinder $G^2$, located within and in contact with the porous lining G. Such perforated cylinder serves to confine the calcium carbid as the latter swells or expands under the action of the water, and thereby prevents the same from pressing outwardly against the porous lining and forcing the latter against the walls of the generating-chamber, it being found in the absence of such inner cylinder that the calcium carbid is packed so tightly in the receptacle, after the charge is exhausted, that it is troublesome to remove the lining and its contents from the chamber, and that the spent charge must be dug out of the lining. When the perforated cylinder $G^2$ is present, the latter, with the spent charge therein, may be easily slipped out of the chamber, leaving the porous lining intact for subsequent use. The lining may thus be used many times without renewal. The cylinder $G^2$ will be preferably corrugated longitudinally, as seen in Fig. 6, so as to allow free passage of water from the lining to the material within the cylinder.

In Fig 7 I have shown a generator constructed as described applied to a lamp-body I, such as is commonly used for bicycle-lamps, the generator in this instance taking the place of the oil-receptacle and burner commonly used on such lamp. The means illustrated for securing the generator to the lamp-body I is in the nature of a bayonet-joint, the same consisting of studs $i$ on opposite sides of the generator and an L-shaped locking-slot $i'$ in the lower flange of the lamp-body in which slot said studs are inserted in a familiar manner.

Figure 8:
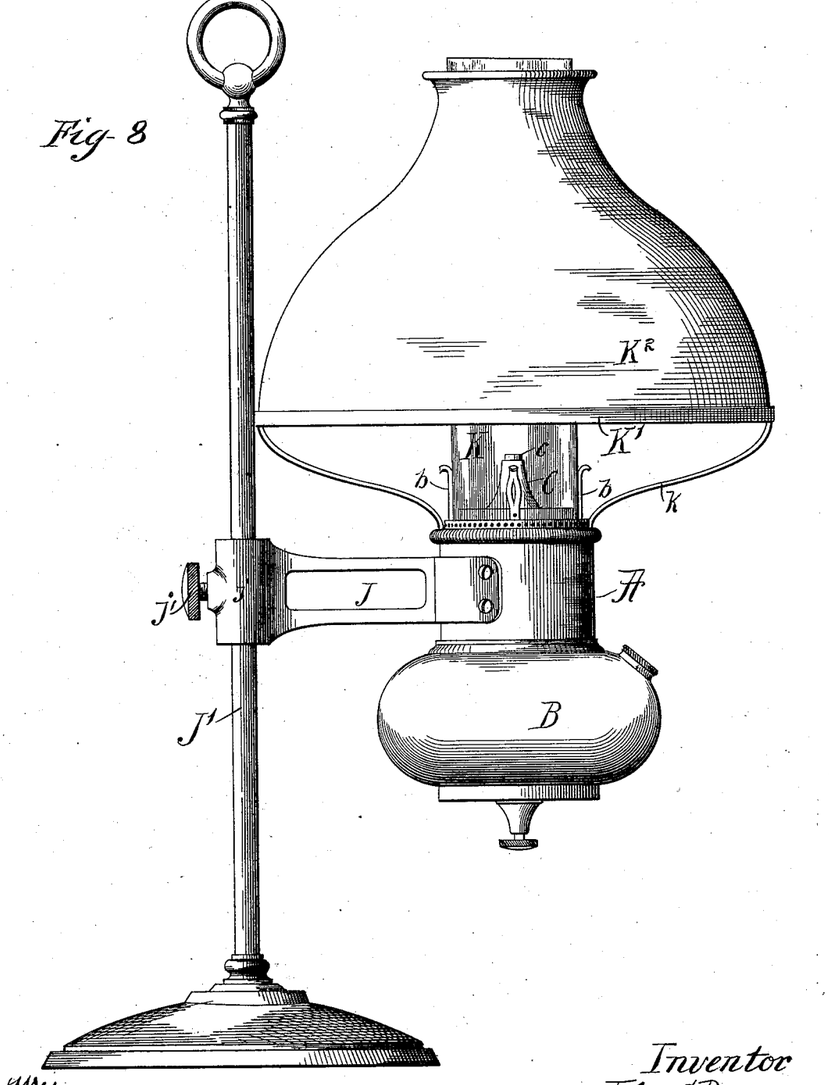
Fig. 8 shows a generator like that shown in Fig. 4 employed as a house or reading lamp.

In Fig. 8 I have shown a gas-generator such as is described as applied to the frame of an ordinary reading-lamp. In this instance a bracket J is attached to the side of a generating-chamber A, the same being provided with a socket $j$ for the passage of a supporting-standard J'. A clamp-screw $j'$ passes through the wall of the socket and engages the standard J' to hold the lamp at a desired elevation. Surrounding the burner $c$ at its supply-tube C are a series of spring-arms $k$, adapted to hold in place a chimney K, while a plurality of arms $k'$ are arranged to support a ring K', by which is sustained a shade of ordinary construction.

Figure 9:
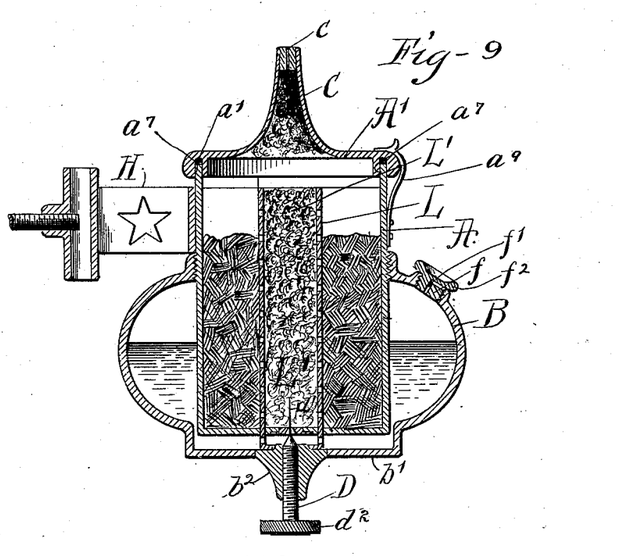
Fig. 9 is a sectional view illustrating a generator in which the receptacle for the calcium carbid is provided with a central perforated tube.

In Fig. 9 I have shown a generator generally similar to that shown in Fig. 1, but differing therefrom by the insertion of a perforated tube L centrally within the generating-chamber A, said tube thus arranged extending to the bottom of the chamber and operating to afford a supply of water to the center of the mass of material in the generating-chamber, such material in this case taking the form of a hollow cylinder or annulus. In connection with such perforated cylinder I employ a filling L' of fibrous or porous material which operates in the manner of a wick to carry the water upwardly from the inlet-opening at the bottom of the cylinder to the material surrounding the same. In this construction the porous filling L' obviously takes the place of the porous layer G as a means of conveying the water to and distributing it over a large area of the calcium carbid, it being obvious that the water will attack the calcium carbid or combine with the same in this instance from the inside of the mass.

In the construction shown in such Fig. 9 the top A' of the generating-chamber instead of being secured to the body thereof by a screw-joint is provided with a deep groove $a^7$, which is adapted to receive the upper margin of the side wall of the chamber, and contains a packing $a'$ of asbestos or other fibrous material. When this construction is used, a plurality of spring-catches, one of which is shown at $a^9$, or similar devices may be employed to hold the cover firmly in place on the chamber.

Figure 10:
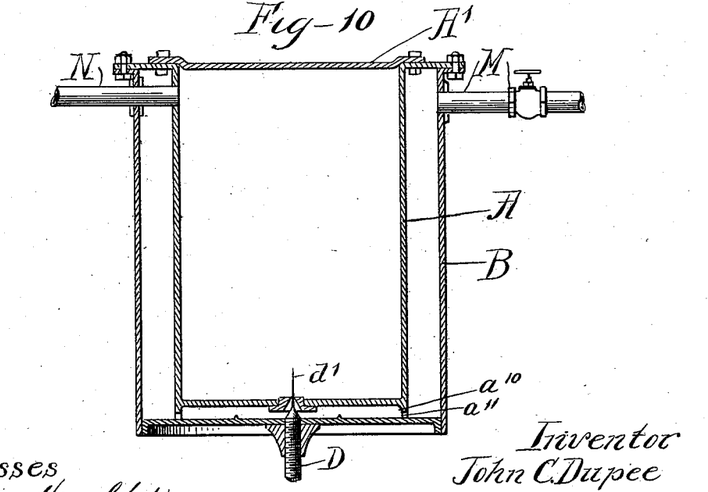
Fig. 10 is a sectional view showing the generator such as might be used for supplying the burners of a house or dwelling.

In Fig. 10 I have shown a slightly-modified form of gas-generator adapted for use in a house for supplying a number of burners. In this instance the generating-chamber A is of cylindric form, while the water-receptacle is formed by a cylinder B, which completely surrounds or incloses the outer wall and bottom of the generating-chamber. In this instance the said wall of the generating-chamber is extended downwardly below its bottom wall into contact with the bottom of the chamber B in the form of a flange $a^{10}$, having at its lower edge inlet-openings $a^{11}$, through which water flows toward the inlet-opening of the generating-chamber, as before described. A supply-pipe M, provided with a valve M' is shown as connected with the water-receptacle for supplying water to the same. A gas-delivery pipe N is attached to the supply part of the generating-chamber for the discharge of gas therefrom. The top A' of the generating-chamber is necessarily made removable to allow the introduction of the charges of calcium carbid and the removal thereof when exhausted.

While I have shown in Figs. 1 to 5, inclusive, the porous lining or layer G as extending throughout the entire inner surface of the bottom and side walls of the generating-chamber, yet the functions performed by the lining thus arranged will be to a considerable extent performed by a porous layer located in contact with the bottom wall only, where the water-supply inlet is at the center of the bottom wall, or adjacent to that part of the wall containing said water-inlet opening if the latter be placed elsewhere than at the center of the bottom wall, an essential feature of said porous lining being its location adjacent to the inlet-opening and between said opening and the body of calcium carbid which is to be acted upon by the water, so that the porous material will by capillary action distribute the incoming water from a large surface or area of the calcium carbid. A similar function is obviously performed by the porous filling within the central tube in Fig. 9. I do not, therefore, wish to be limited to the exact arrangement and construction of such porous layer or lining illustrated in the is found, however, that after the operation of generating the gas is fully under way, said air-valve may be closed, it being supposed that there may be a slight leakage of gas, which is under considerable pressure in the generating-chamber, backwardly into the water-receptacle, this allowing the water to flow with sufficient freedom into the generating-chamber.

The backward escape of gas in any considerable quantities from the generating-chamber into the water-receptacle is undersirable for the reason that gas thus escaped would be liable to leak from the chamber, and being highly inflammable it might take fire at the place of escape. Such backward leakage of gas is not only prevented by the presence of the porous lining B, which, being filled with water, constitutes a substantial barrier to the escape of gas therethrough, but also by the ring or partition E, which, as before described, is provided with small holes $e$ only through which the water may approach the inlet-orifice of the generating-chamber. These holes, moreover, are placed at the lower part of said ring, adjacent to the bottom wall of the water-receptacle, so that it would become necessary for the entire space within the said ring to become filled with gas before it would escape through said holes $e$ to the water-receptacle. The question as to whether there is any backward escape of gas to the water-receptacle permitting the flow of water to the generating-chamber when the filling-orifice is closed may be a doubtful one; but experience has shown that when the parts are constructed as described no backward escape of gas takes place in sufficient quantities to produce a flame when a light is applied at the filling-orifice. It may be assumed, therefore, that even when the filling-orifice is closed by its screw-plug, a quantity of air may still enter the receptacle sufficient to permit the passage of water by capillary action into the generating-chamber and the necessity for admitting air through the filling-opening when the device is first put in operation may arise solely from the necessity of a somewhat greater supply of air at that time. In the absence of careful experiments sufficient to determine these questions with certainty, it is sufficient to state that in practice I have found that if any backward escape of gas takes place it is in such small quantities as to be inappreciable and that the water will be fed properly to the generating-chamber when the filling-orifice is closed by a plug which fits such orifice with ordinary tightness and without special devices for making an air-tight joint.

Inasmuch as the calcium carbid, when combined with the water, is found to swell or increase in bulk to a considerable extent, the generating-chamber will not be entirely filled with the same, but a space will be left in the filling, as shown in the drawings.

As a further improvement, I propose to place in the gas-delivery pipe C a filling of raw cotton or other fibrous material, the same constituting a strainer to arrest fine particles of material being carried into the orifice of the burner, which orifice, owing to the intense light given by the gas generated, will for a lamp of ordinary size be exceedingly minute.

Instead of inserting the calcium carbid into the generating-chamber in the form of loose particles, the same may be prepared in a solid block or cylinder adapted to fit within the said chamber. The use of such a solid mass or cylinder is preferred for the reason that the calcium carbid in this shape is much more easily handled in recharging the generator than the loose material. When thus prepared in a solid mass or cylinder, the calcium carbid may be wrapped or covered with tin-foil or other impervious material, so as to preserve it from the moisture in the air, or, if preferred, the porous lining G may be placed around such cylinder at the time it is first made or thereafter, and the charge for a lamp thus furnished in the form of a cartridge in readiness to be slipped into the generating-chamber when a new charge is required. Such cartridge will consist of a cylindric mass of calcium carbid with a porous covering which may be, of course, wrapped with an impervious coating or wrapper, such as one made of tin-foil, in order to afford protection from moisture until it is used. The cartridge prepared for use is illustrated in Fig. 4, wherein G indicates the porous covering and G′ an external air-tight wrapper. When a cartridge thus made is inserted in the lamp, the covering G at the top of the same will be removed or a number of holes will be punched therein in order to permit the gas to escape freely to the burner.

In Fig. 5 I have shown a generator which is generally similar to that illustrated in Fig. 1, said Fig. 5 being lettered in the same manner as the preceding figures. The generator shown in said Fig. 5 differs from that before described in the following particulars: The generating-chamber A, in this instance, instead of being secured to the water-receptacle B by screw-joint at the top of the water-receptacle, is attached thereto by screw-joint formed between a cylindric part $b^4$ at the bottom of the receptacle and the flange $a^4$ at the lower margin of the generating-chamber, a flange $a^5$, located on the outer surface of the generating-chamber above the upper margin of the receptacle B, being constructed to bear against the same, so as to form a suitably tight joint at this place. Notches $a^6$ are formed in the flange $a^4$, said notches performing the function of the holes $e$, (shown in Fig. 1,) to permit the water to flow toward the inlet-opening $a'$ while preventing any outward flow of gas toward the water-receptacle. I have shown in Fig. 5 a perforated sheet-metal cylinder $G^2$, located within and in contact with the porous lining G. Such perforated cylinder serves to confine the calcium carbid as the latter swells or expands under the action of the water, and thereby prevents the same from pressing outwardly against the porous lining and forcing the latter against the walls of the generating-chamber, it being found in the absence of such inner cylinder that the calcium carbid is packed so tightly in the receptacle, after the charge is exhausted, that it is troublesome to remove the lining and its contents from the chamber, and that the spent charge must be dug out of the lining. When the perforated cylinder $G^2$ is present, the latter, with the spent charge therein, may be easily slipped out of the chamber, leaving the porous lining intact for subsequent use. The lining may thus be used many times without renewal. The cylinder $G^2$ will be preferably corrugated longitudinally, as seen in Fig. 6, so as to allow free passage of water from the lining to the material within the cylinder.

In Fig 7 I have shown a generator constructed as described applied to a lamp-body I, such as is commonly used for bicycle-lamps, the generator in this instance taking the place of the oil-receptacle and burner commonly used on such lamp. The means illustrated for securing the generator to the lamp-body I is in the nature of a bayonet-joint, the same consisting of studs $i$ on opposite sides of the generator and an L-shaped locking-slot $i'$ in the lower flange of the lamp-body in which slot said studs are inserted in a familiar manner.

In Fig. 8 I have shown a gas-generator such as is described as applied to the frame of an ordinary reading-lamp. In this instance a bracket J is attached to the side of a generating-chamber A, the same being provided with a socket $j$ for the passage of a supporting-standard $J'$. A clamp-screw $j'$ passes through the wall of the socket and engages the standard $J'$ to hold the lamp at a desired elevation. Surrounding the burner $c$ at its supply-tube C are a series of spring-arms $k$, adapted to hold in place a chimney K, while a plurality of arms $k'$ are arranged to support a ring $K'$, by which is sustained a shade of ordinary construction.

In Fig. 9 I have shown a generator generally similar to that shown in Fig. 1, but differing therefrom by the insertion of a perforated tube L centrally within the generating-chamber A, said tube thus arranged extending to the bottom of the chamber and operating to afford a supply of water to the center of the mass of material in the generating-chamber, such material in this case taking the form of a hollow cylinder or annulus. In connection with such perforated cylinder I employ a filling $L'$ of fibrous or porous material which operates in the manner of a wick to carry the water upwardly from the inlet-opening at the bottom of the cylinder to the material surrounding the same. In this construction the porous filling $L'$ obviously takes the place of the porous layer G as a means of conveying the water to and distributing it over a large area of the calcium carbid, it being obvious that the water will attack the calcium carbid or combine with the same in this instance from the inside of the mass.

In the construction shown in such Fig. 9 the top $A'$ of the generating-chamber instead of being secured to the body thereof by a screw-joint is provided with a deep groove $a^7$, which is adapted to receive the upper margin of the side wall of the chamber, and contains a packing $a'$ of asbestos or other fibrous material. When this construction is used, a plurality of spring-catches, one of which is shown at $a^9$, or similar devices may be employed to hold the cover firmly in place on the chamber.

In Fig. 10 I have shown a slightly-modified form of gas-generator adapted for use in a house for supplying a number of burners. In this instance the generating-chamber A is of cylindric form, while the water-receptacle is formed by a cylinder B, which completely surrounds or incloses the outer wall and bottom of the generating-chamber. In this instance the said wall of the generating-chamber is extended downwardly below its bottom wall into contact with the bottom of the chamber B in the form of a flange $a^{10}$, having at its lower edge inlet-openings $a^{11}$, through which water flows toward the inlet-opening of the generating-chamber, as before described. A supply-pipe M, provided with a valve $M'$ is shown as connected with the water-receptacle for supplying water to the same. A gas-delivery pipe N is attached to the supply part of the generating-chamber for the discharge of gas therefrom. The top $A'$ of the generating-chamber is necessarily made removable to allow the introduction of the charges of calcium carbid and the removal thereof when exhausted.

While I have shown in Figs. 1 to 5, inclusive, the porous lining or layer G as extending throughout the entire inner surface of the bottom and side walls of the generating-chamber, yet the functions performed by the lining thus arranged will be to a considerable extent performed by a porous layer located in contact with the bottom wall only, where the water-supply inlet is at the center of the bottom wall, or adjacent to that part of the wall containing said water-inlet opening if the latter be placed elsewhere than at the center of the bottom wall, an essential feature of said porous lining being its location adjacent to the inlet-opening and between said opening and the body of calcium carbid which is to be acted upon by the water, so that the porous material will by capillary action distribute the incoming water from a large surface or area of the calcium carbid. A similar function is obviously performed by the porous filling within the central tube in Fig. 9. I do not, therefore, wish to be limited to the exact arrangement and construction of such porous layer or lining illustrated in the accompanying drawings, except as set forth in the appended claims.

I claim as my invention—

1. An acetylene-gas generator comprising a generating-chamber provided with a water-inlet opening, a source or means of water-supply and a layer of porous or absorbent material forming a lining in contact with the bottom and sides of said generating-chamber, said layer being interposed between the calcium carbid contained within the chamber and the said water-inlet opening.

2. An acetylene-gas generator comprising a gas-generating chamber provided with a water-inlet opening in its bottom wall, a source or means of water-supply connected with said opening and a layer of absorbent material forming a lining in contact with the bottom and sides of said generating-chamber, said layer being interposed between the calcium carbid contained within the chamber and the bottom wall of said chamber.

3. An acetylene-gas generator comprising a generating-chamber provided with a water-inlet opening, a source or means of water-supply, a valve controlling the entrance of water to the chamber and a layer or mass of porous or absorbent material forming a lining in contact with the bottom and sides of said chamber, said layer being interposed between the calcium carbid contained within the chamber and the said water-inlet opening.

4. An acetylene-gas generator comprising a generating-chamber provided with a water-inlet opening, a source or means of water-supply, a valve for controlling the said opening, a layer or mass of porous or absorbent material interposed between the calcium carbid contained within the chamber and said water-inlet opening and a movable puncturing-needle adapted for insertion through said water-inlet opening to puncture the layer of porous or absorbent material at a point opposite said opening.

5. An acetylene-gas generator comprising a generating-chamber provided with a water-inlet opening, a source or means of water-supply, a layer or mass of porous or absorbent material interposed between the calcium carbid contained within the chamber and the said water-inlet opening and a valve for controlling the supply of water comprising a screw-threaded stem provided with a conical valve-plug and with a puncturing-needle which extends through the water-inlet opening.

6. An acetylene-gas generator comprising a generating-chamber provided with a water-supply opening in its bottom, a source or means of water-supply connected with said opening and a continuous porous layer or lining extending over and in contact with the bottom and side walls of the chamber.

7. An acetylene-gas generator comprising a generating-chamber, a water-receptacle surrounding the chamber, and extending beneath the bottom wall of the generating-chamber, said chamber being provided with a water-supply opening in its said bottom wall and a valve for said opening provided with a screw-threaded stem which passes through the bottom wall of said water-receptacle.

8. An acetylene-gas generator comprising a generating-chamber, a lining of porous material therein, and an interior lining or cylinder of perforated metal located within said porous lining.

9. In combination with an acetylene-gas generator comprising a gas-generating chamber and a water-receptacle surrounding the same, the lower wall of said receptacle extending beneath the bottom wall of the generating-chamber, said bottom wall of the generating-chamber being provided with a central water-inlet opening, of a water-seal between said inlet-opening and the surrounding water-receptacle comprising an annular wall or partition extending between the bottom of the generating-chamber and the lower wall of the water-receptacle and being provided in its lower part remote from said inlet-opening with a plurality of apertures for the passage of water.

10. An acetylene-gas generator and burner comprising a generating-chamber provided with a central burner-tube at its top extending upwardly therefrom and having a water-inlet opening at its bottom, a water-receptacle surrounding the sides of said chamber and communicating with said water-inlet opening, a lamp-body surrounding said central burner-tube and provided with a downwardly-extending flange fitting over and surrounding the upper part of the generating-chamber, and a detachable locking connection between said generating-chamber and the lamp-body.

In testimony that I claim the foregoing as my invention I affix my signature, in presence of two witnesses, this 26th day of August, A. D. 1896.

JOHN C. DUPEE.

Witnesses:
C. CLARENCE POOLE,
WILLIAM L. HALL.